Aug. 2, 1955
G. P. PROPS
2,714,482
SHIPPING CONTAINER FOR LIVE CHICKS
Filed March 23, 1951
3 Sheets-Sheet 1
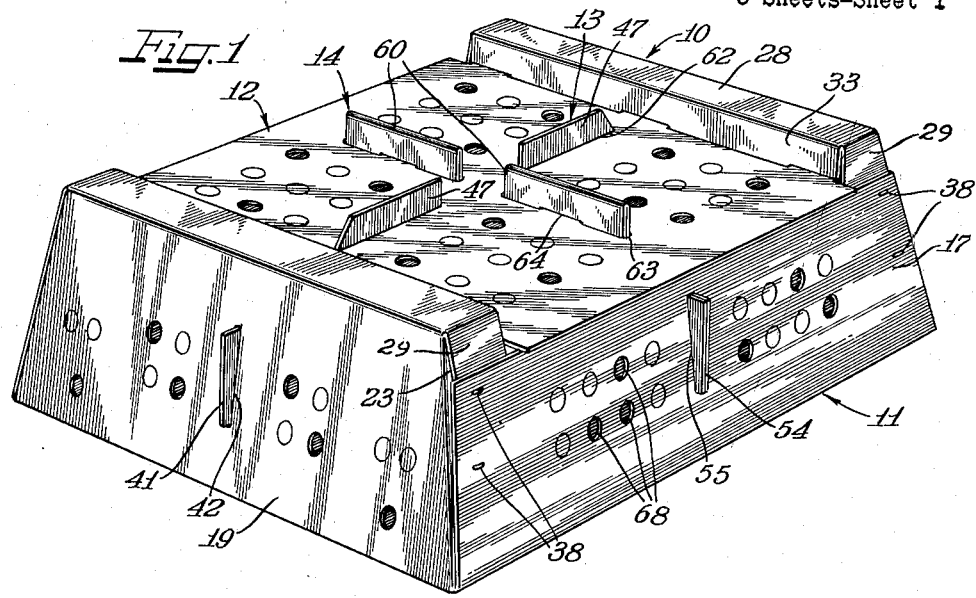
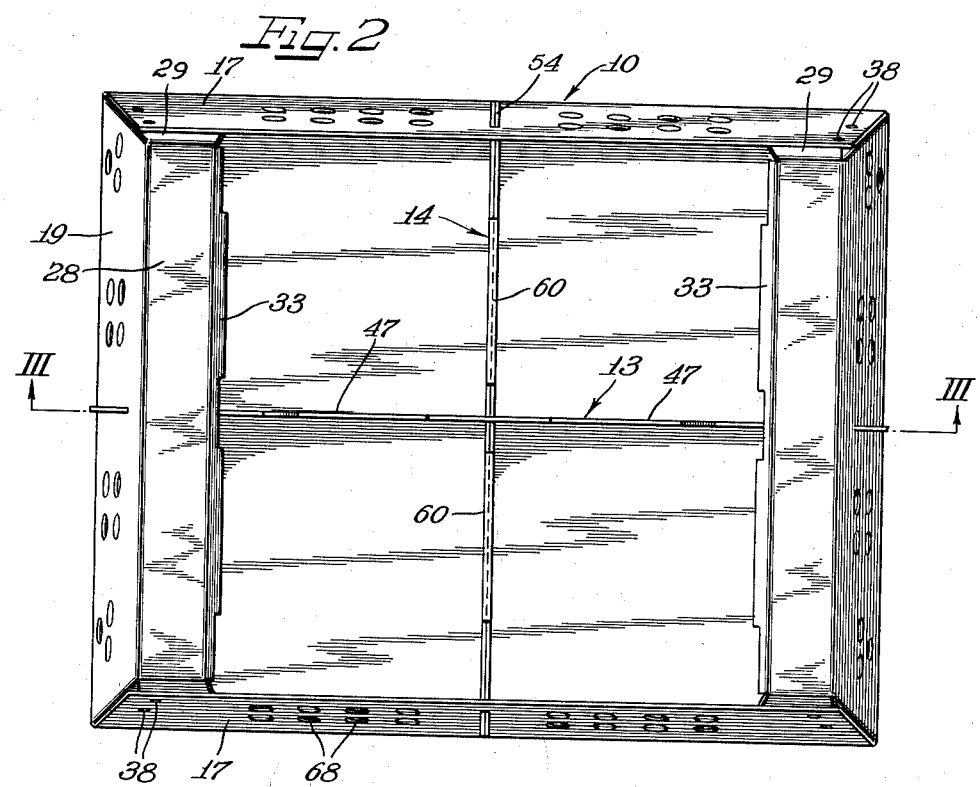
Inventor
George P. Props
by
Attys

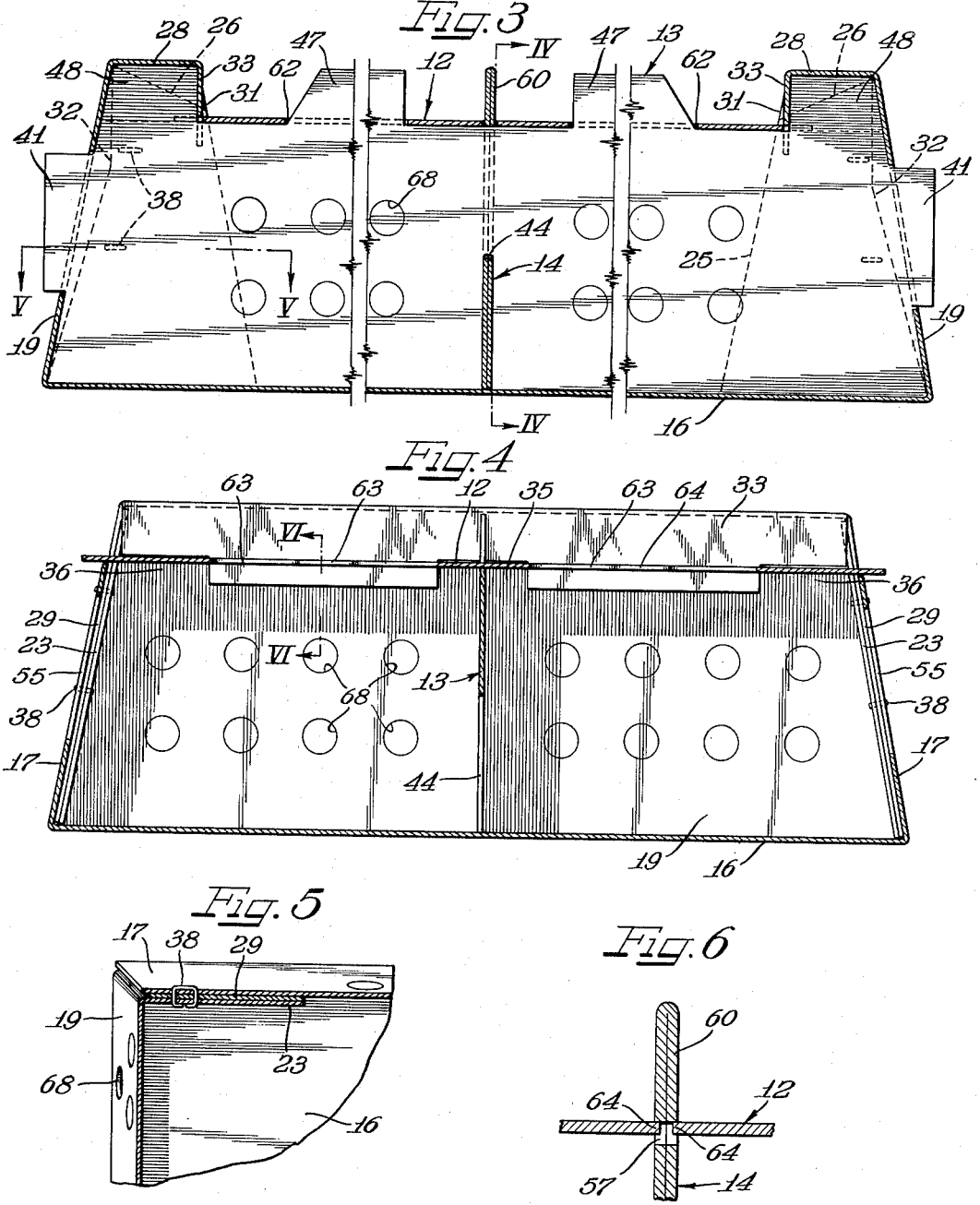

Aug. 2, 1955      G. P. PROPS      2,714,482
SHIPPING CONTAINER FOR LIVE CHICKS
Filed March 23, 1951      3 Sheets-Sheet 3
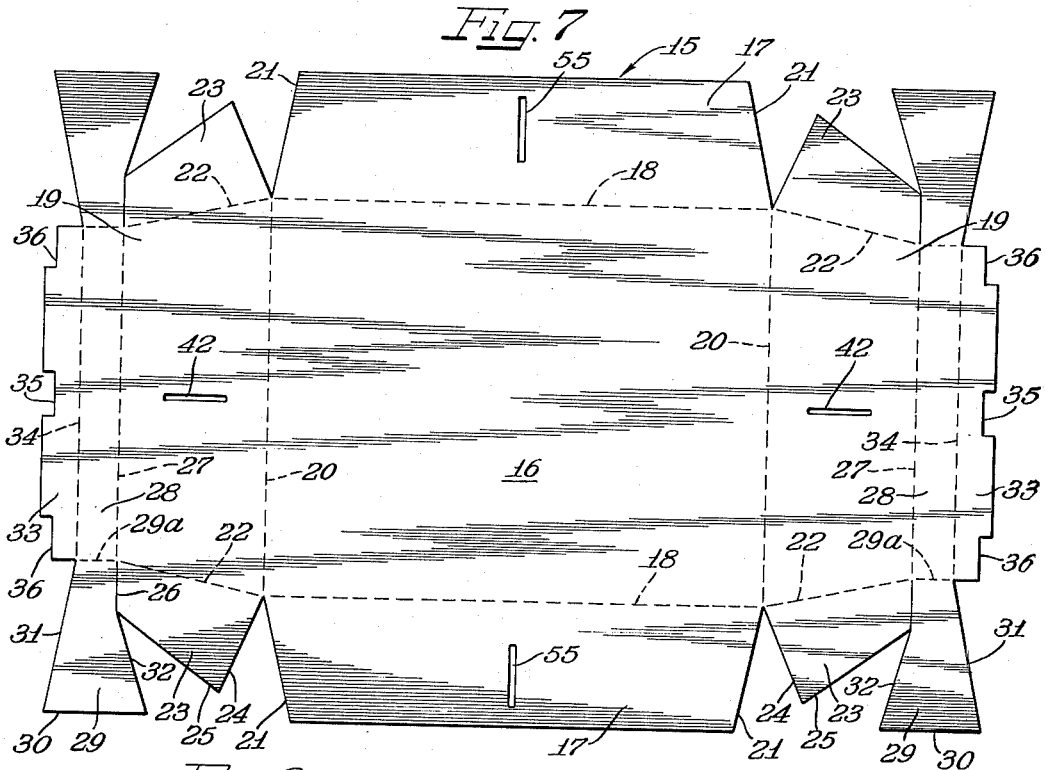
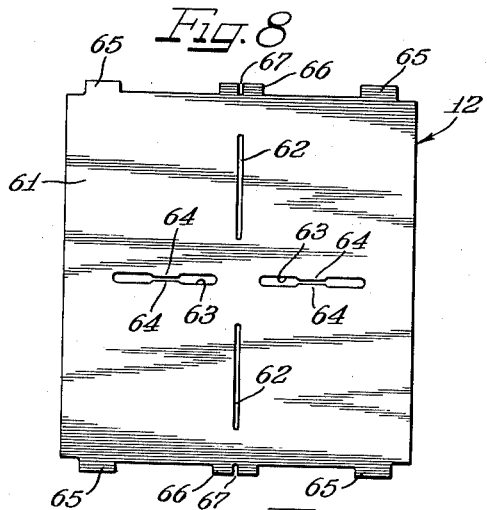
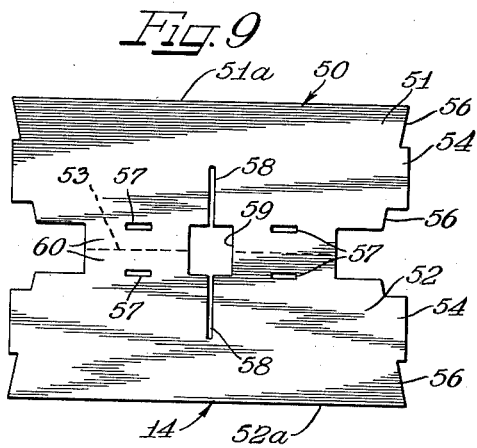
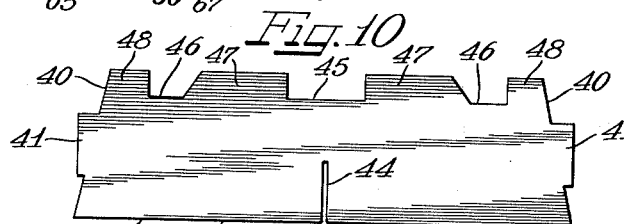
Inventor
George P. Props

United States Patent Office 2,714,482
Patented Aug. 2, 1955

2,714,482

SHIPPING CONTAINER FOR LIVE CHICKS

George P. Props, Fort Wayne, Ind., assignor to Fort Wayne Corrugated Paper Company, Fort Wayne, Ind., a corporation of Indiana Application March 23, 1951, Serial No. 217,273

5 Claims. (Cl. 229—6)

The present invention relates to a shipping container for live chicks, and more particularly to a strong lightweight container adapted for the free flow of air therethrough to accommodate the shipping of live animals, such as baby chicks.

Containers for the shipping of small live animals or poultry, such as chicks, must be light in weight to facilitate handling and reduce shipping expense; strong to protect the animals from crushing during shipment; and adapted for the free flow of air therethrough so that the animals will not suffocate during shipment. In addition, the shipping container must be simple in its construction and assembly to reduce the cost of the container and to accommodate the transportation of a plurality of containers in disassembled condition to their point of use, where the containers are assembled.

The present invention provides a shipping container for live animals which fulfills each of the requirements hereinbefore set forth. Generally, the present invention comprises a container of corrugated paper board, card board or the like, and the container takes the form of a frusto-rectangular pyramid which is provided with raised or offset end portions which project above the main portion of the container to support a container next thereabove in spaced relation to the top of the lower container. The offsets thus accommodate stacking of a plurality of containers in vertical relation, while the upwardly and inwardly sloping side walls of the container provide for the spacing of laterally adjacent containers. The resulting circumferential and top spacing of adjacent containers promotes the circulation of air to and through the containers as an aid in preventing the suffocation of animals therein, and the side walls of the containers, as well as the tops, are perforated to accommodate this air flow.

The container is preferably assembled from a one-piece body blank which need be stapled or otherwise secured only at the corners of the container to provide the side walls, bottom wall, and upwardly projecting offset portions of the container. A separate blank is utilized to provide a container top, and divider means are provided for insertion into the container body to strengthen the body against transverse and longitudinal stresses. The divider means also strengthen and rigidify the container offset portions and the container top, with the top and the divider means being provided with interdigitating elements which retain the top upon the container. The divider means need not be stapled or otherwise secured by extraneous means within the container body, and the only stapling or other securing of the container upon assembly is the hereinbefore referred to securing of the container body corners. The top is interfitted with the body offset portions and the container divider means to prevent transverse and longitudinal separation of the top from the remainder of the container. The container divider means also have upper edges which terminate substantially in the plane of body offset portions in supporting a superimposed container.

It is, therefore, an important object of the present invention to provide an improved shipping container of strong, economical, lightweight construction which is adapted for the free circulation of air therethrough.

Another important object of the present invention is to provide a shipping container for live chicks or the like in the form of a frusto-rectangular pyramid having vertically offset terminal portions for retaining the container in spaced relation to adjacent and superimposed containers to accommodate the flow of air therethrough.

It is a further important object of the present invention to provide an improved shipping container for live chicks or the like including a body formed from a one-piece blank having multi-thickness corners, integrally formed bottom, side walls and end walls, and integrally offset portions projecting vertically beyond the side walls and end walls, the container body, including the offset portions thereof, being retained in assembled relation solely by fastening means located at the corners of the body.

Still another important object of the present invention is the provision of a paperboard shipping container having integrally formed bottom, side walls and end walls, offset end portions projecting vertically above the side and end walls, and divider means for subdividing the interior of the container, the divider means having upstanding projections reinforcing the offset portions of the container and additional projections lying substantially in the horizontal plane of the offset portions to aid the same in supporting a superimposed container.

Yet a further important object of the present invention is the provision of a container for live chicks or the like comprising a body portion defining an interior space, divider means positioned in the interior space, the divider means rigidifying the container body portion, and a separable top overlying the interior space, the divider means and the top being provided with mutually supporting, interdigitating elements.

Other and further important objects and features of this invention will be apparent from the disclosures in the specification and the accompanying drawings.

On the drawings:

Figure 1 is a perspective view of an assembled box or container of the present invention;

Figure 2 is a plan view of the box of Figure 1;

Figure 3 is a sectional view taken along the plane III—III of Figure 2;

Figure 4 is a sectional view taken along the plane IV—IV of Figure 3;

Figure 5 is a fragmentary sectional view illustrating a corner construction of the container;

Figure 6 is a fragmentary sectional view illustrating in detail the means for retaining the container top against vertical separation;

Figure 7 is a plan view of a blank from which the body of the container is formed;

Figure 8 is a plan view of a blank from which the top of the container is formed;

Figure 9 is a plan view of a blank from which a container transverse partition is formed; and Figure 10 is a plan view of a longitudinal partition blank.

As shown on the drawings:

In Figure 1, reference numeral 10 refers generally to a container of the present invention in its finally assembled form, the container including a container body portion 11, a container top 12, a longitudinal interior divider 13, and a transverse interior divider 14.

As best shown in Figure 7, the container body portion 11 is formed from a blank 15 provided with a central floor portion 16 having longitudinally extending side walls 17 joining the floor portion by crease or fold lines 18. The floor portion 16 is also provided with end wall portions 19 also joined to the body portion by fold lines 20. It will be noted that the side walls 17 are provided with inclined transverse edges 21, and the corresponding end wall edges are defined by inclined fold lines 22 which join the end walls to end wall flaps 23. The end wall flaps are provided with free marginal edges 24, 25 and 26 which are inclined with respect to one another and with respect to the fold line 22 so that the end wall flap 23 is of an irregular trapezoidal form, as will be hereinafter more fully explained.

A longitudinal extremity of each end wall 19 is joined, as by a fold or crease edge 27, to an offset cover wall 28 which is generally rectangular in form and which carries terminal offset flaps 29 having a free terminal edge 30 and inclined side edges 31 and 32. The offset cover wall is joined to a terminal offset end wall 33 by a fold line 34, and the free edge of the offset end wall 33 is provided with a central recess 35 and end recesses 36 for a purpose to be hereinafter more fully described.

To assemble the body 11 of the container 10, the side walls 17 and the end walls 19 are first deformed upwardly in the same direction along the fold lines 18 and 20, respectively. Due to the inclined edges 21 of the side walls 17 and the inclined fold lines 22 of the end walls 19, the side and end walls will each be inclined inwardly and upwardly with respect to the floor 16, and the flaps 23 may be folded inwardly at this time into flush engagement with the inner surfaces of corner portions of the side walls 17. The offset cover walls 28 are next deflected along the fold lines 27 to lie in a horizontal plane substantially parallel to the plane of the body floor portion 16, and th offset flaps 29 are deflected downwardly along the fold lines 29a to depend from each offset cover wall. The downwardly deflected flaps are preferably interposed between the end wall flaps 23 and the adjacent portions of the side walls 17. The side and end walls may now be secured toegther to form the container body by suitable means, such as staples 38. These staples 38 pass through the side walls 17 adjacent each corner of the side walls, through the offset flaps 29, and through the end wall flaps 23 to secure the side walls and end flaps together with the offset flaps 29 interposed therebetween.

This detail is best illustrated in Figure 5, in which the interposed position of the offset flaps 29 will be observed, and in Figure 3 where the position of the flaps 23 and 29 is indicated in dotted outline. It will be apperciated that the edges 24 of the flaps 23 and the edges 30 of the flaps 29 are each in contact with the floor 16 of the container and that the edges 31 and 25 of the flaps 29 and 23, respectively, are flush with one another. It will be noted that the edge 32 of the offset flap 29 is displaced inwardly from the corner of the container (Figure 3) so that there is no interference with the formation of the exact corner by the end wall flap 23.

The interior of the assembled container body 11 is traversed and subdivided by the longitudinal partition 13 and the transverse partition 14, particularly illustrated in Figures 10 and 9, respectively. The longitudinal partition 13 is provided with inclined, substantially vertical edges 40 adapted to mate with and conform to the upwardly and inwardly inclined end walls 19 to lie flush against the inner surfaces thereof. Outwardly extending locking projections 41 are adapted to project from the edges 40 for reception by corresponding slots 42 formed centrally in the end walls to lie in a vertical plane when the body 15 is assembled as hereinbefore described. The longitudinal partition 13 is provided with a bottom edge 43 for extended edge contact with the container floor 16 to extend longitudinally therealong, and the edge 43 is broken by an upwardly extending open-bottomed slot 44 provided for cooperation with the transverse partition 14 as will be hereinafter more fully described. The partition 13 is also provided with a central open-topped recess 45 at its upper edge portion and with longitudinally spaced identical recesses 46 of either side of the central recess 45. The recesses 45 and 46 cooperate to define a pair of upper tabs 47 formed integrally with the partition 13 intermediate the length of the upper edge thereof, and the recesses 46 each cooperate with the outer edges 40 of the partition to define upwardly projecting offset tabs 48 adjacent each edge 40.

The transverse partition 14 is formed from a blank 50 illustrated in Figure 9, this blank comprising a pair of partition flaps 51 and 52 which are identical, but mirror images of one another, and foldable about a central longitudinal fold line 53 into conforming contact to define a double thickness partition. Each blank flap 51—52 is provided with an outer edge 51a and 52a, respectively, and with terminal locking projections 54 similar to the locking projections 41 of the longitudinal partition 13 and insertable within corresponding slots 55 formed centrally in the side walls 17. The locking projections 54 project outwardly from substantially vertical edges 56 of the flaps 51—52 which were adapted to conform to and snugly abut the inner surfaces of the side walls 17 when the blank is assembled as hereinbefore described.

Each blank flap 51—52 is provided with a pair of spaced projection slots 57 adjacent the fold line 53 and with a central inwardly extending open topped slot 58 adapted for coaction with slot 44 of the partition 13, and the slots 58 communicate with a central aperture 59 which becomes a pair of coextensive open-topped slots when the blanks 51—52 are folded about the fold line 53.

The partitions 13 and 14 are inserted in the body 11 by slightly deflecting the same from their normal planar configurations, so that the locking projections 41 and 54 may each be inserted through the corresponding slots 42 and 55 formed in the end walls 19 and the side walls 17, respectively, with the partition bottom edges 43, 51a and 52a being firmly bottomed against the upper surface of the floor 16. If desired, the partitions may be provided with crease lines to promote flexing thereof at a desired location during assembly.

Actually, the transverse partitions 14 and the longitudinal partition 13 are preferably installed in the assembled body container as a unit, and it will be seen that the sub-assembly of the partitions is facilitated by the cooperating slots 44 and 58 which receive the corresponding portions of the partitions, respectively.

After insertion of partition sub-assembly within the assembled container body, the adjacent folded portions 60 of the partition flaps 51—52, which are defined by the central aperture 59, provide upstanding tabs as best illustrated in Figures 3, 4 and 6.

When the longitudinal partition is so positioned within the body 11, the offset tabs 48 underlie the offset cover walls 28 (Figure 3), and the outline shape of the offset tabs 48 conforms to the undersurfaces of the offset portions of the body. The offset end walls 33 may now be turned downwardly about the fold lines 34, so that the inner surfaces of the offset end walls contact the inner side surfaces of the offset tabs. The recess 34 is of such depth that the recess bottom edge snugly contacts the bottom of the recesses 46 formed in the longitudinal partition, and it will thus be seen that the longitudinal partition offset tabs 48 serve to support the offset cover walls 28, while the inner edges of the offset tabs support the offset end walls against undue inward displacement.

The top 12 is illustrated in plan in Figures 2 and 8, and from Figure 8 it will be seen that the top 12 comprises a central portion 61 which is provided with a pair of aligned longitudinally spaced slots 62 and with a pair of aligned transverse slots 63 which are each provided with centrally located, opposing, inwardly extending slot projections 64. The top transverse edges are provided with a pair of tabs 65 adjacent each corner thereof and with a centrally located tab 66 having a central slot 67.

The top is assembled upon the body-partition sub-assembly by flexing the top, preferably at the center thereof, so that the tabs 65 and 66 may be inserted into the recesses 36—35, respectively, of the offset end wall 33. The tab slots 67 of the top 12 receive therein the offset tabs 48 of the longitudinal partition 13, and it will be seen that those portions of the top transverse edges lying between the tabs 65—66 snugly abut the exposed surface of the offset end walls 33 to retain the end walls in their downwardly deformed position. The slots 62 of the top 12 receive the upper tabs 47 of the longitudinal partition 13 therein, while the transversely aligned slots 63 receive the tabs 60 of the transverse partition 14 therein. The transverse partition projection slots 57 lie substantially in the plane of the top 12 after the top is telescoped over the partition tabs, and these slots 57 receive therein the slot projections 64 of the top (Figure 6) to lock the top against vertical separation.

It will be seen from Figures 1–5, inclusive, that the side and end walls of the container body and the partitions 13 and 14, together with the top 12, are each provided with a plurality of aligned and spaced circular apertures 68. The apertures 68 are actually formed by severing the paperboard portions defining the container, so that the severed portions may be readily pushed from the plane of the corresponding box portion to form apertures which accommodate the flow of air through the container to prevent suffocation of animals therein.

The completed box is quite sturdy and strong for its weight, inasmuch as each of the box components is mutually supporting. For example, the container bottom or floor 16 is supported against upward displacement by the lower edges of the longitudinal and transverse partitions 13 and 14, respectively. At the corners of the container the floor is supported by the lower edges 24 and 30 of the end wall flaps 23 and offset flaps 29, respectively. The walls of the container are supported against inward deflection by the inclined, substantially vertical edges about the longitudinal and transverse partitions, and the walls are supported against vertical deflection by the locking projections of the partitions projecting through the wall slots. The container offset portions are reinforced by the longitudinal partition offset tabs 48 positioned within the offsets, and the offset end wall is reinforced by the bearing contact of the same at the bottom of the longitudinal partition recesses 46. The top is supported against inward deflection by the partitions and against longitudinal and transverse shifting movement by the partition tabs extending through the top slots, by the top tabs projecting into the offset portions through the offset end wall recesses, and by the top slot projections entered in the projection slots of the transverse partition. The top slot projections, by virtue of their entry into the projection slots, also prevent accidental vertical separation of the top from the remainder of the container.

Thus, it will be seen that the present invention provides an extremely strong, mutually supporting container for live chicks or the like. The container is assembled by the utilization of staples or other fastening means only at the corner of the container body, while the offset portions of the container and the sloping container side and end walls insure adequate circulation of air in the container regardless of the manner in which a plurality of containers are stacked or otherwise disposed.

Other and further important objects and features of this invention will be apparent from the disclosures in the specification and the accompanying drawings.

I claim as my invention:

1. A blank for a container comprising a rectilinear bottom, trapezoidal side and end walls connected with the margins of said bottom, end wall flaps connected with the lateral margins of said trapezoidal end walls and each having a free marginal edge extending angularly from adjacent a corner of said bottom for engagement with the bottom upon assembly of the blank, and a further free marginal edge extending from the outer margin of said end wall for extending parallel to the base upon assembly of the blank, said end walls having offset cover walls connected to the outer margins thereof and of a width corresponding to the length of said second mentioned free marginal edges of said end wall flaps for support by said second mentioned free marginal edges upon assembly of the blank, terminal offset flaps extending laterally from the lateral margins of said offset cover wall and of length corresponding to the length of said end walls and each having a lateral free marginal edge for engagement with the bottom upon assembly of the blank for further support of the offset cover wall connected therewith, and an offset end wall connected at the outer margin of each of said offset cover walls.

2. A container comprising a rectilinear bottom, opposite trapezoidal side walls extending upwardly from said bottom and connected integrally therewith, trapezoidal end walls extending upwardly from opposite margins of said bottom and extending above said side walls, end wall flaps extending laterally from the lateral margins of said end walls and having lower free marginal edges resting on said bottom and upper free marginal edges extending parallel to the bottom at the level of the upper margins of said end walls, offset cover walls extending horizontally from the upper margins of said end walls in overlying relation to said upper free marginal edges of said end wall flaps, said offset cover walls having laterally extending terminal offset flaps extending from the lateral edges thereof downwardly between said end wall flaps and said side walls and having free marginal lower edges engaging said bottom, and said offset cover walls having downturned terminal offset flaps.

3. A container comprising a rectilinear bottom, opposite trapezoidal side walls extending upwardly from said bottom and connecting integrally therewith, trapezoidal end walls extending upwardly from opposite margins of said bottom and extending above said side walls, end wall flaps extending laterally from the lateral margins of said end walls and having lower free marginal edges resting on said bottom and upper free marginal edges extending parallel to the bottom at the level of the upper margins of said end walls, offset cover walls extending horizontally from the upper margins of said end walls in overlying relation to said upper free marginal edges of said end wall flaps, said offset cover walls having laterally extending offset flaps extending from the lateral edges thereof downwardly between said end wall flaps and said side walls and said offset cover walls having down-turned terminal offset flaps, a longitudinal partition extending between said end walls and having upwardly extending projections contacting the under surfaces of said offset cover walls to support the same, a top lying substantially in the plane of the upper edges of said side walls and between said terminal offset flaps and having projections extending in interlocking relation to said terminal offset flaps.

4. A container comprising a rectilinear bottom, opposite trapezoidal side walls extending upwardly from said bottom and connecting integrally therewith, trapezoidal end walls extending upwardly from opposite margins of said bottom and extending above said side walls, end wall flaps extending laterally from the lateral margins of said end walls and having lower free marginal edges resting on said bottom and upper free marginal edges extending parallel to the bottom at the level of the upper margins of said end walls, offset cover walls extending horizontally from the upper margins of said end walls in overlying relation to said upper free marginal edges of said end wall flaps, said offset cover walls having laterally extending offset flaps extending from the lateral edges thereof downwardly between said end wall flaps and said side walls, and said offset cover walls having down-turned terminal offset flaps, a longitudinal partition extending between said end walls and having upwardly extending projections contacting the under surfaces of said offset cover walls to support the same, a top lying substantially in the plane of the upper edges of said side walls and between said terminal offset flaps and having projections extending in interlocking relation to said terminal offset flaps, said top projections interlocking with the downturned terminal offset flaps including central tabs each having a slot extending from the free edge thereof and receiving an edge of one of said projections of said longitudinal partition.

5. A container comprising a rectilinear bottom, opposite trapezoidal side walls extending upwardly from said bottom and connected integrally therewith, trapezoidal end walls extending upwardly from opposite margins of said bottom and extending substantially above said side walls, offset cover walls extending horizontally from and integral with the upper margins of said end walls, said offset cover walls having integral laterally extending offset flaps extending from the lateral edges thereof downwardly along side of said side walls, said offset cover walls having integral downturned terminal offset flaps, and a separate removable top lying substantially in the plane of the upper edges of said side walls and between said terminal offset flaps and having projections extending in interlocking relation to said terminal offset flaps.

References Cited in the file of this patent

UNITED STATES PATENTS

| | | |
|---|---|---|
| 1,946,554 | Sutherland | Feb. 13, 1934 |
| 2,076,018 | Ferguson | Apr. 6, 1937 |
| 2,113,097 | Schaefer | Apr. 5, 1938 |
| 2,138,112 | Means et al. | Nov. 29, 1938 |
| 2,167,691 | Shoemaker et al. | Aug. 1, 1939 |
| 2,170,723 | Marx | Aug. 22, 1939 |
| 2,232,632 | Reynolds | Feb. 18, 1941 |
| 2,288,457 | Inman | June 30, 1942 |
| 2,350,932 | Schaefer | June 6, 1944 |
| 2,486,743 | Haffner | Nov. 1, 1949 |
| 2,527,221 | Huye | Oct. 24, 1950 |
| 2,643,810 | Fleming | June 30, 1953 |